(No Model.)  2 Sheets—Sheet 1.

J. C. THOMPSON.
COVER FOR EARTHENWARE VESSELS.

No. 282,802.  Patented Aug. 7, 1883.

WITNESSES
G. Nottingham
G. F. Downing

INVENTOR
John C. Thompson
By Leggett & Leggett,
Attorney (No Model.) 2 Sheets—Sheet 2.
J. C. THOMPSON.
COVER FOR EARTHENWARE VESSELS.
No. 282,802. Patented Aug. 7, 1883.
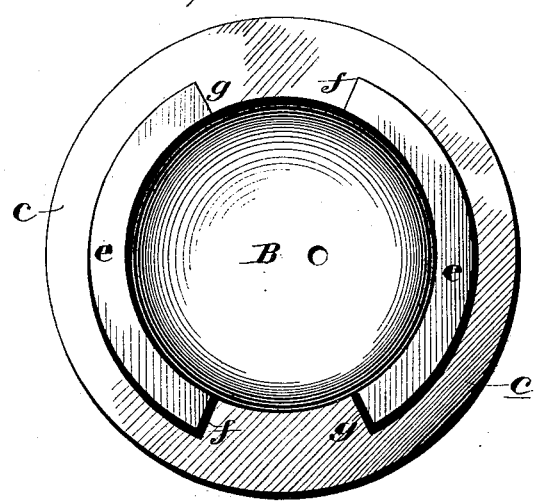
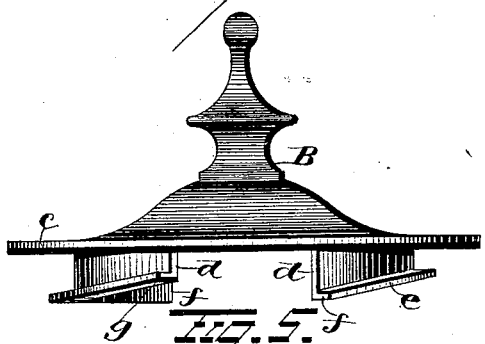
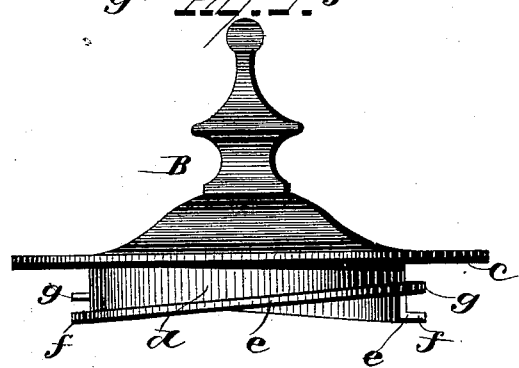
WITNESSES
INVENTOR

UNITED STATES PATENT OFFICE.

JOHN C. THOMPSON, OF EAST LIVERPOOL, OHIO.

COVER FOR EARTHENWARE VESSELS.

SPECIFICATION forming part of Letters Patent No. 282,802, dated August 7, 1883.

Application filed June 1, 1883. (No model.)

*To all whom it may concern:*

Be it known that I, JOHN C. THOMPSON, of East Liverpool, in the county of Columbiana and State of Ohio, have invented certain new and useful Improvements in Pottery and Glassware and Covers Therefor; and I do hereby declare the following to be a full, clear, and exact description of the invention, such as will enable others skilled in the art to which it appertains to make and use the same.

My invention relates to an improvement in the manufacture of pottery and glassware and covers therefor, the object of the same being to provide simple and efficient means whereby the covers or lids are securely held in position and prevented from being displaced when the article is tilted in pouring therefrom and with this end in view my invention consists in the parts and combination of parts, as will be more fully described, and pointed out in the claims.

Figure 1:
Figure 2:
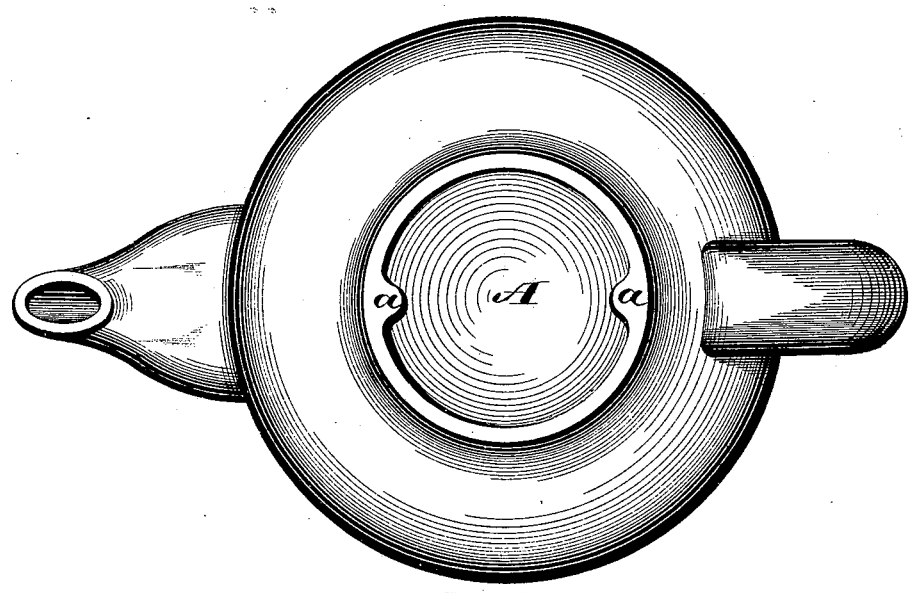

In the accompanying drawings, Figure 1 is a view in side elevation of a tea-pot and cover. Fig. 2 is a plan view of the tea-pot with the cover removed. Fig. 3 is a bottom plan view of the lid. Fig. 4 is a view in side elevation of the same; and Fig. 5 is also a side elevation of the cover, taken from another position.

A represents a pot of any desired design and shape, and made of pottery, glassware, or other suitable material, and provided at its neck or rim with two or more inwardly-projecting lugs, a, preferably formed integral with the body of the pot. These lugs are situated on diametrically-opposite sides of the neck, and are adapted to engage the lips e of the cover B. This cover is preferably made of metal of any suitable design, and is provided with a wide or expanded bearing, c, which latter rests on the upper edge of the pot, and forms a close joint therewith. This bearing is made wide to adapt one size of cover or lid to pots having different-sized necks. Each cover is also provided with two downwardly-projecting flanges, d, of considerable length, formed concentric with the periphery of the cover, and each downwardly-projecting flange is provided with outwardly-projecting lips, e, which latter are adapted to engage the lugs on the inner face of the neck. The flanges d are made tapering from their front ends, f, to their rear ends g, and the lips e, which are formed integral with the said flanges, also incline upwardly in the same direction, the taper or inclination of the said lips being such that the space between the upper end g of the lip and the bearing-face of the cover is too restricted to admit of the passage of the smallest lugs a. The flanges and lips are situated diametrically opposite each other, a sufficient space, however, being left between the adjacent ends of the lips for the passage of the lugs.

To secure the cover in position it is simply necessary to place it on the pot and turn it until the lugs a enter the spaces between the lips. The cover is then turned to the right, and the lugs enter the grooves or spaces between the lips and bearing-face, and become wedged in the space between the bearing-face of the cover and the lips. This firmly draws the cover down on the neck of the pot and prevents it from shaking or falling off when the pot is tilted. This lid is particularly adapted for pottery-ware, as it accommodates itself to irregularities of the openings and in the size of the lugs a, and enables one size of cover to be used on pots that have had a light fire and pots that have had a hard fire. Pots that are fired light do not shrink at the top so much as a "hard-fired" one, and as it is a matter of impossibility to have all parts of a kiln of ware subjected to the same amount of heat, it follows that articles that were of one size before they were burned, will be of different sizes after they are taken from the kiln. Consequently, by enlarging the bearing-face of the lid and securing the sloping lids thereto, I am enabled to use one size of lid on different size pots.

This device is exceedingly simple, can be manufactured at a small initial cost, and is durable and effective in use.

It is evident that slight changes in the construction might be resorted to without departing from the spirit of my invention, and hence I would have it understood that I do not confine myself to the exact construction shown and described, but consider myself at liberty to make such changes and alterations as fairly fall within the spirit and scope of my invention.

I am aware that fruit-jars have had lugs formed on the inner sides of their necks with which engage lugs or depending-flanges secured to the covers. I am also aware that earthenware coffee-pots have been provided with lugs or ribs for preventing the accidental displacement of the cover but not for forming a tight joint; also, that metal coffee-pots have been provided with means for insuring a steam-tight joint between the cover and receptacle; hence I would have it understood that I make no broad claims covering the different forms of construction above referred to. My improved coffee-pot is made of earthenware, and has inwardly-projecting lugs formed integral with the cover-supporting flange, while the cover is provided with inclined flanges that engage said lugs, whereby a tight joint is formed between the cover and the pot.

Having fully described my invention, what I claim as new, and desire to secure by Letters Patent, is—

An earthenware receptacle provided with a cover-supporting flange at its upper end, said flange being formed with inwardly-projecting lugs, in combination with a cover having an enlarged bearing-face, and provided with inclined flanges and lips adapted to engage said lugs and form a tight joint between the cover and receptacle, substantially as set forth.

In testimony whereof I have signed this specification in the presence of two subscribing witnesses.

JOHN C. THOMPSON.

Witnesses:
R. W. TAYLER,
GEO. A. HUMRICKHOUSE.